(12) United States Patent
Nakamura et al.

(10) Patent No.: US 8,963,868 B2
(45) Date of Patent: Feb. 24, 2015

(54) IMAGE EDITING METHOD AND IMAGE EDITING APPARATUS

(71) Applicant: Fujifilm Corporation, Tokyo (JP)

(72) Inventors: Samito Nakamura, Tokyo (JP); Yuzo Aoshima, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 46 days.

(21) Appl. No.: 13/846,560

(22) Filed: Mar. 18, 2013

(65) Prior Publication Data

US 2013/0222313 A1 Aug. 29, 2013

Related U.S. Application Data

(63) Continuation of application No. PCT/JP2011/071102, filed on Sep. 15, 2011.

(30) Foreign Application Priority Data

Sep. 27, 2010 (JP) .................. 2010-214941

(51) Int. Cl.
*G06F 3/041* (2006.01)
*G06F 3/0488* (2013.01)
(Continued)

(52) U.S. Cl.
CPC ............ *G06F 3/041* (2013.01); *G06F 3/04883* (2013.01); *G06T 11/60* (2013.01); *H04N 1/387* (2013.01); *H04N 1/3872* (2013.01); *G06F 3/04845* (2013.01); *G06F 2203/04808* (2013.01)
USPC ........... 345/173; 345/179; 345/660; 345/667; 715/863; 715/835

(58) Field of Classification Search
CPC ... G06F 3/04883; G06F 3/017; G06F 3/0481; G06F 3/0488; G06F 2203/04807
USPC ......... 345/173–179, 670, 671, 619, 650, 661, 345/156–158; 715/800, 788, 835, 863
See application file for complete search history.

(56) References Cited

U.S. PATENT DOCUMENTS

2006/0001650 A1* 1/2006 Robbins et al. ............... 345/173
2009/0244618 A1 10/2009 Yamaji et al.
(Continued)

FOREIGN PATENT DOCUMENTS

JP 2003-323241 A 11/2003
JP 2008-27453 A 2/2008
(Continued)

OTHER PUBLICATIONS

International Search Report in PCT/JP2011/071102 filed Oct. 11, 2011.
(Continued)

*Primary Examiner* — Lun-Yi Lao
*Assistant Examiner* — Md Saiful A Siddiqui
(74) *Attorney, Agent, or Firm* — McGinn IP Law Group, PLLC

(57) ABSTRACT

An image editing apparatus has editing functions for editing a still image displayed on a screen of an LCD. The image editing apparatus is provided with a touch panel, a judgment section, and a display controller. The judgment section determines which of the editing functions is requested to be executed, in accordance with how a second touch operation is performed while a first touch operation on the still image on the touch panel is maintained. The display controller executes the editing function determined by the judgment section, and displays an edited image on the LCD.

11 Claims, 17 Drawing Sheets

(51) Int. Cl.
*G06T 11/60* (2006.01)
*H04N 1/387* (2006.01)
*G06F 3/0484* (2013.01)

(56) References Cited

U.S. PATENT DOCUMENTS

2010/0026719 A1* 2/2010 Ozawa et al. ............... 345/650
2010/0060588 A1* 3/2010 Fong ........................... 345/173
2010/0289825 A1* 11/2010 Shin et al. .................... 345/667
2011/0072393 A1* 3/2011 Wilairat ....................... 715/811
2011/0102464 A1* 5/2011 Godavari ..................... 345/650
2011/0181527 A1* 7/2011 Capela et al. ................ 345/173

FOREIGN PATENT DOCUMENTS

JP 2009-238162 A 10/2009
JP 2009-244725 A 10/2009

OTHER PUBLICATIONS

European Search Report dated Sep. 15, 2014.

* cited by examiner

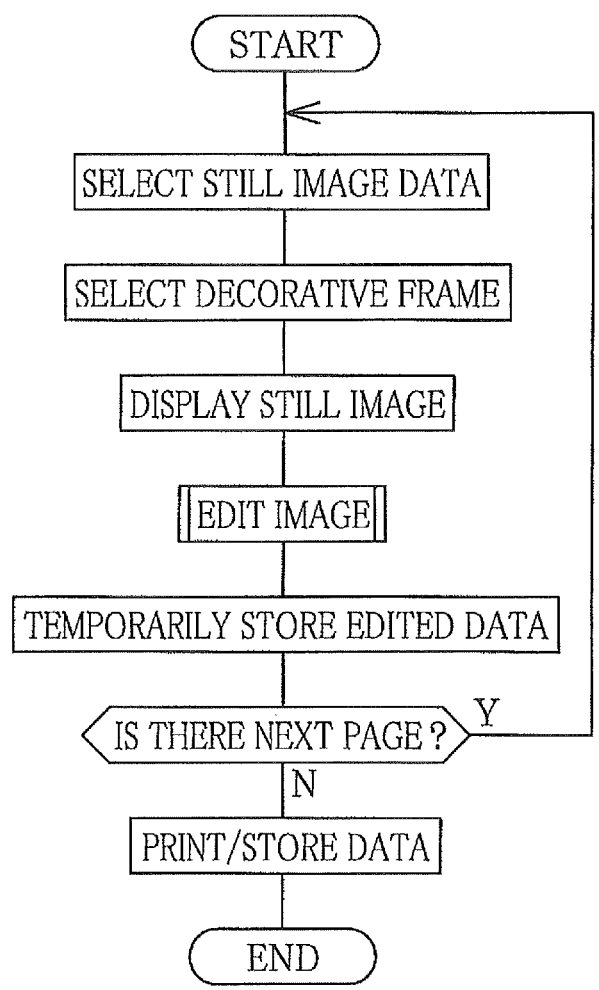

IMAGE EDITING METHOD AND IMAGE EDITING APPARATUS

BACKGROUND OF THE INVENTION

1. Field of the Invention

The present invention relates to an image editing method and an image editing apparatus for editing a still image on a display screen.

2. Description Related to the Prior Art

A photobook in which still images, captured with a digital camera or the like, are laid out like an album is known. The photobook is viewed as an electronic album when the laid out still images are outputted to a display device. The photobook can be viewed as an ordinary photo album when the still images are printed on printing media such as paper.

As described in Japanese Patent Laid-Open Publication No. 2009-238162 and U.S. Patent Application Publication No. 2009/0244618 (corresponding to Japanese Patent Laid-Open Publication No. 2009-244725), an image editing apparatus capable of editing still images on a screen is used for creating a photobook. The image editing apparatus has various editing functions such as a function to enlarge or reduce a still image, a function to rotate a still image to adjust its orientation, a cropping function to cut off or remove a part of a still image, a function to display text on or around a still image, and a function to put a still image in a decorative frame. Thereby, the image editing apparatus allows an operator not only to lay out the still images but also to perform various processes on each of the still images.

By processing the still images, the photobook becomes highly attractive as compared with the photo album or the electronic album in which photographs or still images are just laid out. This is why the photobook is useful in keeping the still images for commemoration or as a gift.

The image editing apparatus is installed in a photo development shop or the like. A shop clerk operates the image editing apparatus at a customer's request or a customer him/herself operates the image editing apparatus to create a desired photobook. There have been cases where a customer or even a shop clerk was not accustomed to operation of the image editing apparatus with many functions and took a long time to create a photobook. It is desired to improve operability of the image editing apparatus to allow the shop clerk or the customer who are not accustomed to the operation to create an attractive photobook easily.

For example, the Japanese Patent Laid-Open Publication No. 2009-238162 discloses that an attractive photobook is created easily by grouping still images according to directions of eyes of subjects and automatically arranging the still images such that the eyes of the subjects are directed to the center of two facing pages. The U.S. Patent Application Publication No. 2009/0244618 discloses that a sensor distinguishes between users who selected images. Thereby, operability is improved when still images are selected by two or more users simultaneously.

The U.S. Patent Application Publication No. 2009/0244618 discloses that a touch panel is used as a device for inputting an operation. Because the touch panel allows intuitive operation such as touching an icon or the like on a screen with a finger or an exclusive pen to provide input, it is easy for even an inexperienced user to understand or learn the operation. Operability is improved as compared with the case where a pointing device such as a mouse is used.

When the image editing apparatus with the touch panel is used, a desired editing function is set by operating one of icons or selecting one of menu items from a menu list. The icons or menu items correspond to the respective editing functions. Operation corresponding to the selected function is performed on the still image, being an object, and thus the still image is edited. This type of operation, however, requires setting of the editing functions, and is not easy for a user not accustomed to the operation because the setting operation is bothersome, the icons and menu items to be used are difficult to find, and the like.

As described above, in the present situation, even the image editing apparatus with the touch panel lacks consideration on an operation method for editing a still image. It is desired that the operation of editing a still image on the screen of the image editing apparatus with the touch panel to be more intuitive.

SUMMARY OF THE INVENTION

An object of the present invention is to provide an image editing method and an image editing apparatus capable of editing a still image with intuitive operation and improving operability.

An image editing apparatus of the present invention comprises a touch panel, a judgment section, and a display controller. The image editing apparatus has editing functions for editing at least one still image on a display screen. The touch panel is provided over the display screen. the touch panel detects a position of a touch operation when the position over the display screen is pressed by the touch operation. The judgment section determines which of the editing functions is requested to be executed, in accordance with how a second touch operation is performed after a first touch operation is performed on the still image. The display controller controls a display on the display screen. The display controller executes the editing function determined by the judgment section.

It is preferable that the judgment section determines that the second touch operation is performed when the touch operation is performed on another position while the first touch operation is maintained.

It is preferable that the display controller displays a mark on the display screen when the first touch operation is stopped before the second touch operation is performed. The mark indicates a position of the first touch operation. The judgment section determines that the second touch operation is performed when the touch operation is performed while the mark is displayed.

It is preferable that one of the editing functions is a cropping function for removing a part of the still image. The judgment section determines that execution of the cropping function is requested when the second touch operation is performed outside of the still image after the first touch operation on the still image, and the display controller removes the part of the still image along a boundary when a position of the second touch operation is moved to traverse the still image after the judgment section determines that the execution of the cropping function is requested. The boundary is set based on a trajectory of the second touch operation.

It is preferable that the display controller determines whether a traversing speed for moving the position of the second touch operation to traverse the still image is faster than a predetermined value. When the display controller determines that the traversing speed is faster than the predetermined value, the display controller sets a straight line corresponding to the trajectory as the boundary. When the display controller determines that the traversing speed is slower than the predetermined value, the display controller sets the trajectory as the boundary.

It is preferable that the display controller removes an area of the still image, on an opposite side of the first touch operation with respect to the boundary.

It is preferable that the display controller displays an assistance line on the display screen when the execution of the cropping function is requested. The assistance line indicates the boundary.

It is preferable that one of the editing functions is a guide line display function for displaying a guide line used for aligning at least first and second still images. The judgment section determines that execution of the guide line display function on the first still image is requested when the second touch operation is performed on the second still image after the first touch operation on the first still image. The display controller displays the guide line so as to come in contact with the first still image when the judgment section determines that the execution of the guide line display function is requested.

It is preferable that one of the editing functions is a magnification function for enlarging or reducing the still image to a desired size. The judgment section determines that execution of the magnification function is requested when a distance between a position of the first touch operation and a position of the second touch operation is widened and narrowed by moving the position of the second touch operation relative to the position of the first touch operation. The display controller obtains a magnification for enlargement or reduction based on a ratio between a distance from the position of the first touch operation to the position of the second touch operation before a movement and a distance from the position of the first touch operation to the position of the second touch operation after the movement when the judgment section determines that the execution of the magnification function is requested. The display controller enlarges or reduces the still image from the position of the first touch operation using the magnification.

It is preferable that one of the editing functions is a rotation function for rotating the still image by a desired inclination. The judgment section determines that execution of the rotation function on the still image is requested when the position of the second touch operation is moved in arc around the position of the first touch operation. The display controller obtains an angle between two line segments and rotates the still image by the angle about the position of the first touch operation when the judgment section determines that the execution of the rotation function is requested. An end of each of the line segments is the position of the first touch operation. The other end of one of the line segments is the position of the second touch operation before a movement. The other end of the other line segment is the position of the second touch operation after the movement.

It is preferable that the display controller displays an icon indicating the next operable editing function on the display screen when the touch operation is performed on the still image.

An image editing method of the present invention comprises a determining step and a controlling step. The determining step determines which of the editing functions is requested to be executed, in accordance with how a second touch operation is performed after a first touch operation is performed on the still image on the display screen. The controlling step controls a display of the display screen to execute the editing function determined.

In the present invention, when the second touch operation is performed with a finger on the display screen, one of the editing function is determined and executed in accordance with how the second touch operation is performed. Thereby, the still image is edited only with the intuitive operation, that is, the touch operation on the display screen. There is no need to operate an icon or a menu item in editing the still image. Thus, the operability in editing the still image on the display screen is improved significantly.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 9 is a flowchart illustrating steps for operating the image editing apparatus;

DESCRIPTION OF THE PREFERRED EMBODIMENTS

Figure 1:
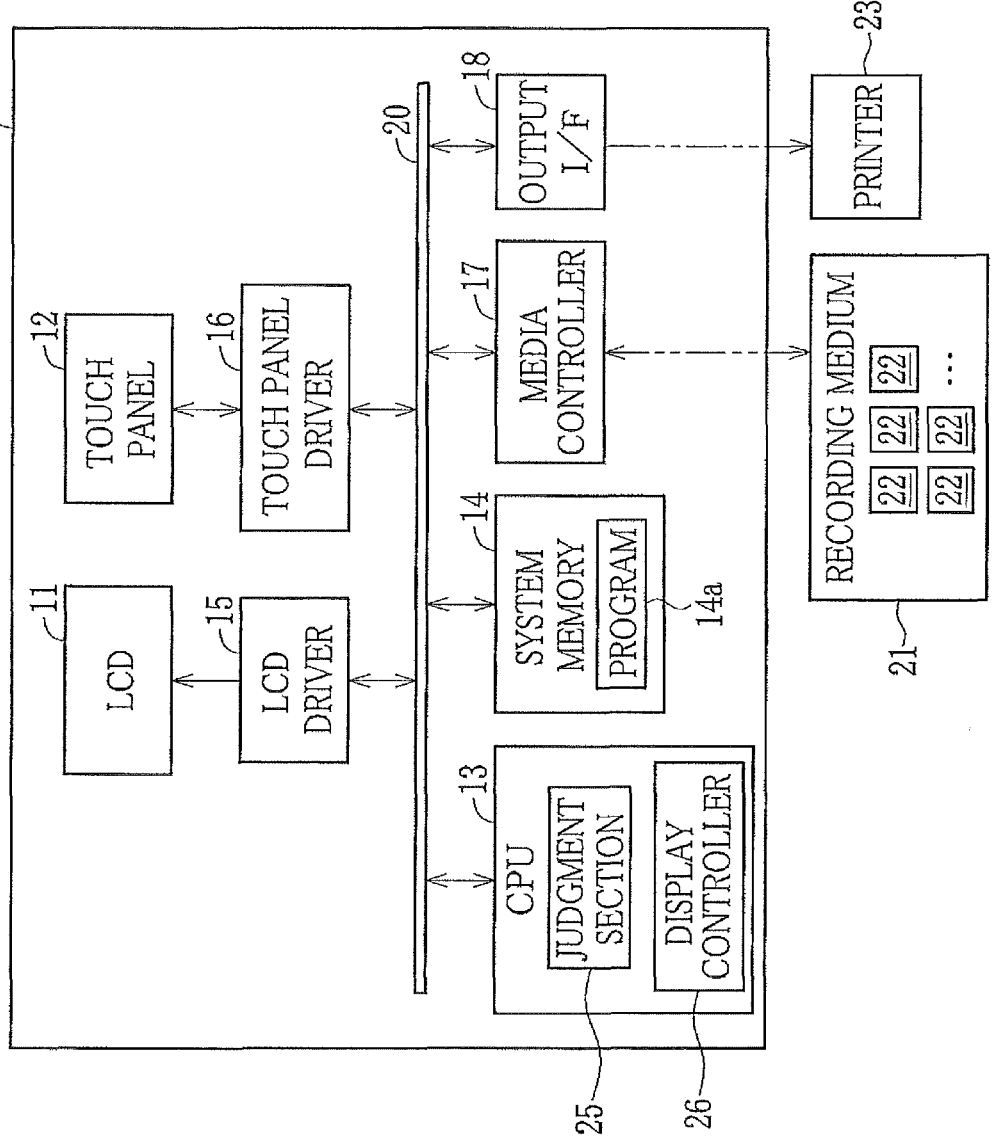
FIG. 1 is a block diagram schematically illustrating a configuration of an image editing apparatus.

As shown in FIG. 1, an image editing apparatus 10 is provided with an LCD (liquid crystal display) 11 and a touch panel 12. The LCD 11 of the image editing apparatus 10 displays various operation screens for editing a still image 32 (see FIG. 2A). As is well known, when a surface of the touch panel 12 is pressed (touched) with a finger or an exclusive pen (hereinafter, this operation is referred to as the touch operation), the touch panel 12 detects the position of the touch operation. The touch panel 12 is a transparent sheet attached over a screen 30 (see FIG. 2A) of the LCD 11. The size of the touch panel 12 is substantially the same as that of the screen 30. The touch panel 12 covers the entire screen 30 in a transparent manner. When two or more touch operations are performed on respective positions on the screen 30 simultaneously, the touch panel 12 detects the positions of the touch operations simultaneously.

The image editing apparatus 10 performs various processes on the still image 32 displayed on the LCD 11, and edits the still image 32 on the screen 30 of the LCD 11. Thereby, the image editing apparatus 10 creates a photobook in which the still images 32 are laid out like an album. In the image editing apparatus 10, the touch panel 12 is provided over the screen 30 of the LCD 11. Thereby, various operations necessary for creating the photobook, for example, editing the still image 32, are performed by intuitive operation, namely, by pressing (touching) the screen 30 with the finger or the exclusive pen.

The image editing apparatus 10 is provided with a CPU 13, a system memory 14, an LCD driver 15, a touch panel driver 16, a media controller 17, and an output interface (I/F) 18, in addition to the LCD 11 and the touch panel 12. Each section is mutually connected through a bus 20.

The system memory 14 has a ROM area and a RAM area, as is well known. The ROM area stores a program 14a corresponding to various processes of the image editing apparatus 10 and various types of data necessary for the processes of the program 14a. The RAM area temporarily stores various types of data produced during the processes of the program 14a, and the like. The CPU 13 reads out the program 14a from the system memory 14, and executes the program 14a sequentially. Thereby, the CPU 13 controls each section of the image editing apparatus 10.

The LCD driver 15 controls the operation of the LCD 11. The LCD driver 15 outputs an image signal, corresponding to a command from the CPU 13, to the LCD 11. Thereby, the LCD driver 15 allows the screen of the LCD 11 to display various images such as an operation screen. The touch panel driver 16 controls operation of the touch panel 12. When the touch panel 12 detects the touch operation at a position over the screen 30, the touch panel driver 16 converts a detected result indicating the position of the touch operation into an electric signal and inputs the electric signal to the CPU 13.

The media controller 17 has a media slot that detachably holds a recording medium 21. In response to a command from the CPU 13, the media controller 17 accesses the recording medium 21 inserted into the media slot, and writes and reads data to and from the recording medium 21. The CPU 13 accesses the recording medium 21 through the media controller 17 when the CPU 13 takes in still image data for creating a photobook from the recording medium 21 and writes data of a created photobook to the recording medium 21, for example.

Note that the recording medium 21 may be a well-known medium such as a USB memory or an SD card. The media controller 17 compliant with the standard of the recording medium 21 is employed as necessary. The media controller 17 may be compatible with various types of recording media 21 and capable of reading and writing data to and from each type of the recording media 21.

The output I/F 18 has a connector into which an end of a cable is fitted. The cable connects the image editing apparatus 10 and a printer 23. Through the connector and the cable, the output I/F 18 is electrically connected to the printer 23. In response to a command from the CPU 13, the output I/F 18 outputs print data to the printer 23. Thereby, the output I/F 18 allows the printer 23 to print based on the print data.

The CPU 13 produces the print data, compliant with a model of the printer 23, from the data of the created photobook, for example. The CPU 13 outputs the print data to the printer 23 through the output I/F 18. Thereby, the data of the photobook is printed on a printing medium and thus the creation of the photobook is completed. Note that the printer 23 is a well-known printer, for example, an inkjet printer that deposits ink on glossy or coated paper to produce an image or a photographic printer that exposes photographic paper to produce an image.

The CPU 13 is provided with a judgment section 25 and a display controller 26. Based on a result of detection (detection result) of the touch operation by the touch panel 12, the judgment section 25 determines whether execution of various editing functions for editing the still image 32 displayed on the LCD 11 is requested. The display controller 26 executes a requested editing function (image processing) in accordance with how the touch operation is performed on the touch panel 12 and a result of the determination of the judgment section 25.

The editing functions executed by the display controller 26 include a move function, a magnification function, a rotation function, a cropping function, and a guide line display function. The move function is a function to move the still image 32 to a desired position on the screen 30. The magnification function is a function to enlarge or reduce the size of the still image 32 as desired. The rotation function is a function to rotate the still image 32 by a desired angle (inclination). The cropping function is a function to cut off or remove a part of the still image 32. The guide line display function is a function to display guide line(s) to align the still images 32 neatly. The touch operations corresponding to the respective editing functions are performed on the touch panel 12. Thereby, the display controller 26 requests the execution of the editing function designated by the touch operation.

Figure 2A:
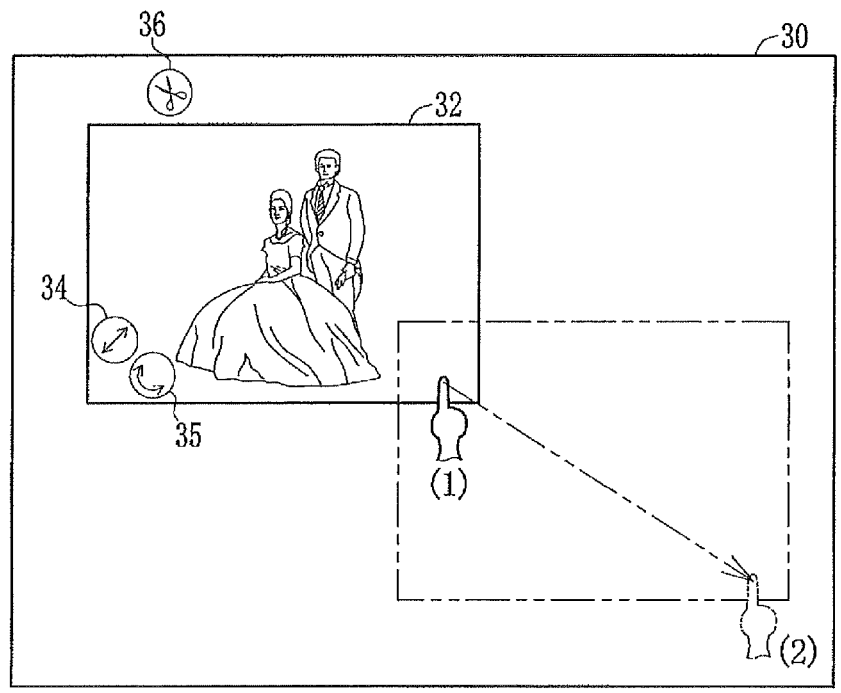
FIG. 2A is an explanatory view illustrating how a move function is operated.

As shown in FIG. 2A, to request the execution of the editing function, first, a touch operation is performed on the still image 32, displayed on the LCD 11, through the touch panel 12. Thereby, the still image 32 is designated as an object of editing. When the CPU 13 receives the detection result of the touch panel 12 from the touch panel driver 16, the display controller 26 compares the image on the LCD 11 and the detection result. From the result of the comparison, the CPU 13 determines whether the detected touch operation is performed on the still image 32. Upon determining that the touch operation is performed on the still image 32, the CPU 13 designates the still image 32 as the object of editing.

The CPU 13 maintains the designation of the still image 32 as the object of editing while the touch operation is maintained. When the touch operation is cancelled, the CPU 13 cancels the designation of the still image 32 as the object of editing.

In response to the designation of the still image 32 as the object of editing by the CPU 13, the judgment section 25 starts determining whether the execution of various editing functions is requested. After the designation of the object of editing, the display controller 26 displays a magnification icon 34, a rotation icon 35, and a crop icon 36 on the LCD 11. The magnification icon 34 indicates that the magnification function is operable. The rotation icon 35 indicates that the rotation function is operable. The crop icon 36 indicates that the cropping function is operable.

The display controller 26 displays the icons 34, 35, and 36 on respective positions, opposite to the position of the touch operation on the still image 32 in a right-left direction, on the screen 30. At this time, the display controller 26 displays the magnification icon 34 and the rotation icon 35 in a corner portion within the still image 32 designated as the object of editing. The display controller 26 displays the crop icon 36 outside of and close to the still image 32. Hence, as shown in FIG. 2A, when the touch operation is performed on a rightward position within the still image 32, the magnification icon 34 and the rotation icon 35 are displayed in a lower left corner portion or an upper left corner portion of the still image 32. The crop icon 36 is displayed outside of and close to a leftward end of the still image 32.

As shown in FIG. 2A, to move the image, the touch operation is performed on the still image 32 and the position of the touch operation is moved on the screen 30 while the still image 32 is pressed (touched) through the touch panel 12. When the above operation is detected by the touch panel 12, the judgment section 25 determines that the execution of the move function on the still image 32, being the object of editing, is requested. Note that numbers in parentheses in the drawing schematically show the order of the touch operations.

Figure 2B:
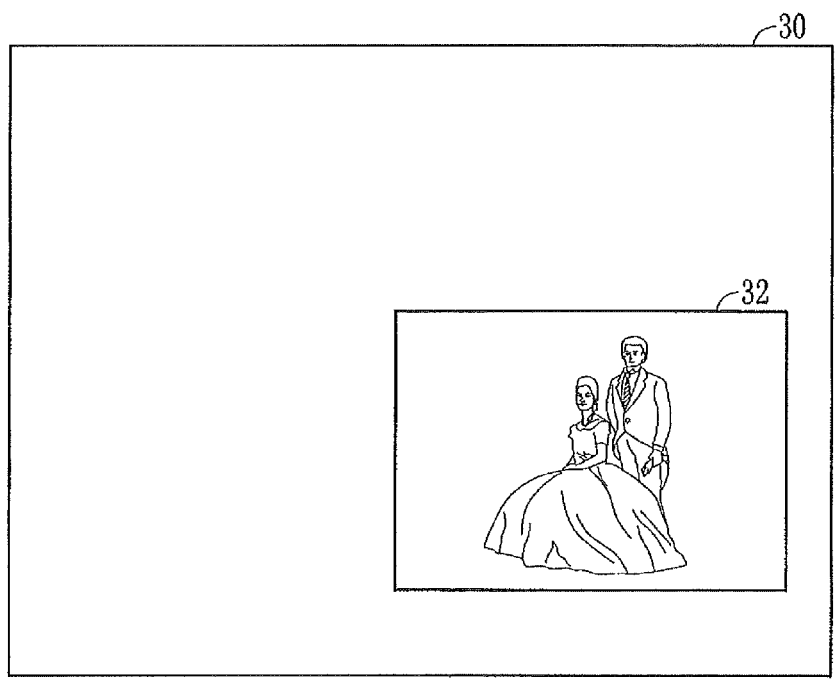
FIG. 2B is an explanatory view illustrating a result of operation of the move function.

When the judgment section 25 determines that the execution of the move function is requested, a position on the still image 32, being the object of editing, on which a first touch operation is performed is set as a reference point. As shown in FIG. 2B, the display controller 26 moves the still image 32 such that the reference point is moved to a position of the touch operation after the movement. Thus, the still image 32 displayed on the LCD 11 is moved to a desired position on the screen 30 by requesting the execution of the move function.

Note that in FIGS. 2A and 2B, it seems as if the still image 32 moves intermittently from the starting point to the end point of a trajectory of the touch operation. Actually, the still image 32 moves continuously in accordance with the movement of the touch operation. Only one still image 32 is displayed on the screen 30 of the LCD 11. The move function can be executed when two or more still images are displayed on the screen 30. When one of the still image is moved and overlapped onto another still image, the display controller 26 displays the still images such that the moved still image, being the object of editing, is placed on top of the other still image.

Figure 3A:
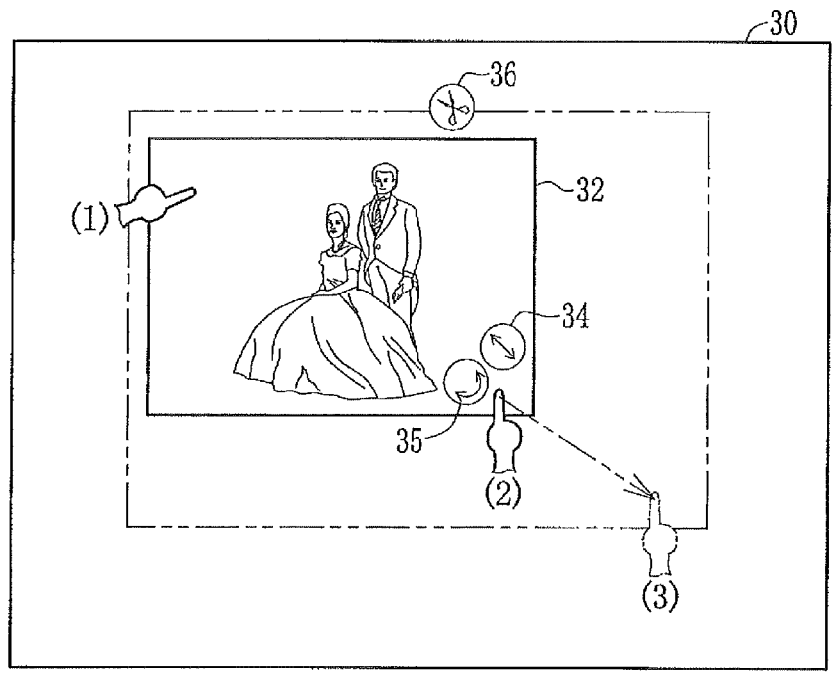
FIG. 3A is an explanatory view illustrating how a magnification function is operated.

As shown by (1) in FIG. 3A, to request the execution of the magnification function, a first touch operation is performed on the still image 32. Then, as shown by (2), a second touch operation is performed on the still image 32 while the position of the first touch operation is fixed. In this state, the position of the second touch position is moved to a position shown by (3), and a distance between the position of the first touch operation and the position of the second touch operation is widened and narrowed. The judgment section 25 determines that the execution of the magnification function on the still image 32, being the object of editing, is requested when the above-described operation is detected by the touch panel 12, The magnification icon 34 is displayed within the still image 32, being the object of editing. A mark of a linear two-way arrow, indicating directions in which the position of the second touch position is moved, helps to show the above-described operation for requesting the magnification function.

Figure 3B:
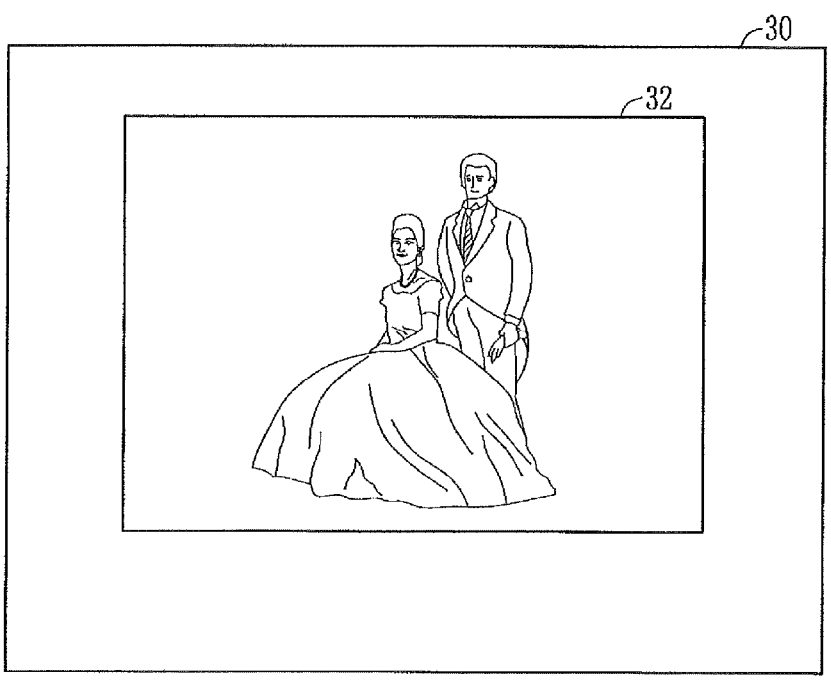
FIG. 3B is an explanatory view illustrating a result of operation of the magnification function.

When the judgment section 25 determines that the execution of the magnification function is requested, the display controller 26 obtains a magnification for enlargement or reduction from a distance between (1) and (2) and a distance between (1) and (3). As shown in FIG. 3B, the display controller 26 sets the position of the first touch operation as the reference point, and enlarges or reduces the still image 32, being the object of editing, by the magnification obtained.

Thus, the execution of the magnification function is requested. By widening the distance between the positions of the respective touch operations, the still image 32 displayed on the LCD 11 is enlarged to a desired size. By narrowing the distance between the positions of the touch operations, the still image 32 is reduced to a desired size.

Note that, the still image 32 is enlarged or reduced continuously in accordance with the movement of the position of the second touch operation, in a manner similar to the move function. The magnification function can be executed in a state where two or more still images are displayed on the screen 30, in a manner similar to the move function. When the still image is enlarged by executing the magnification function and overlaps another image, the still images may be displayed such that the enlarged still image, being the object of editing, is displayed on top of the other, in a manner similar to the move function. Alternatively, the other image may be shifted so as not to overlap the enlarged still image, being the object of editing.

Figure 4A:
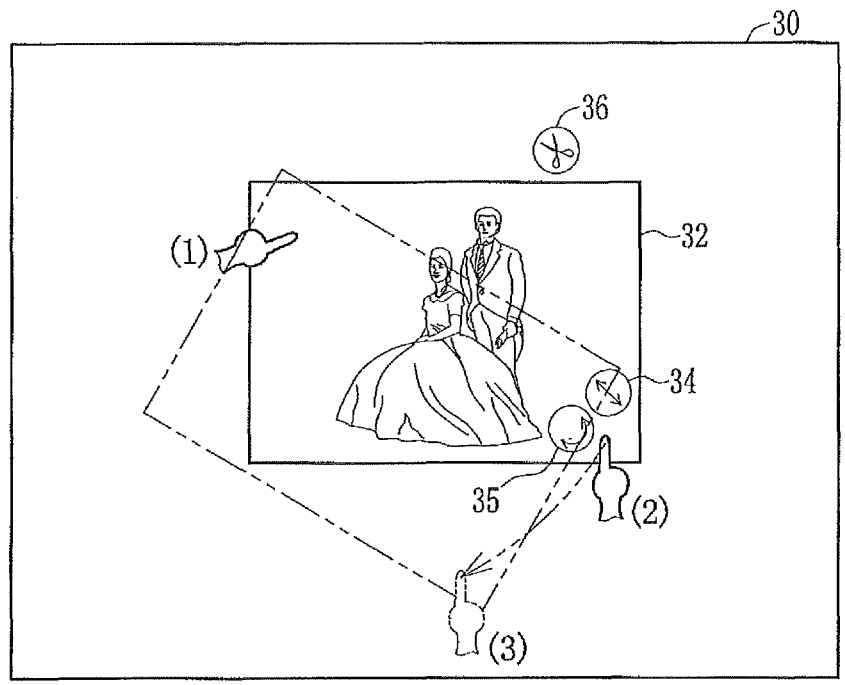
FIG. 4A is an explanatory view illustrating how a rotation function is operated.

As shown by (1) in FIG. 4A, to request the execution of the rotation function, the first touch operation is performed on the still image 32. Then, the second touch operation, shown by (2), is performed on the still image 32 while the position of the first touch operation is fixed. In this state, the position of the second touch operation is moved in arc or rotated about (1) until the position of the second touch operation reaches a position shown by (3). When the above-described operation is detected by the touch panel 12, the judgment section 25 determines that the execution of the rotation function on the still image 32, being the object of editing, is requested.

The rotation icon 35 is displayed within the still image 32, being the object of editing. A mark of an arc-shaped two-way arrow, indicating the movement of the second touch position, helps to show the above-described operation for requesting the rotation function.

Figure 4B:
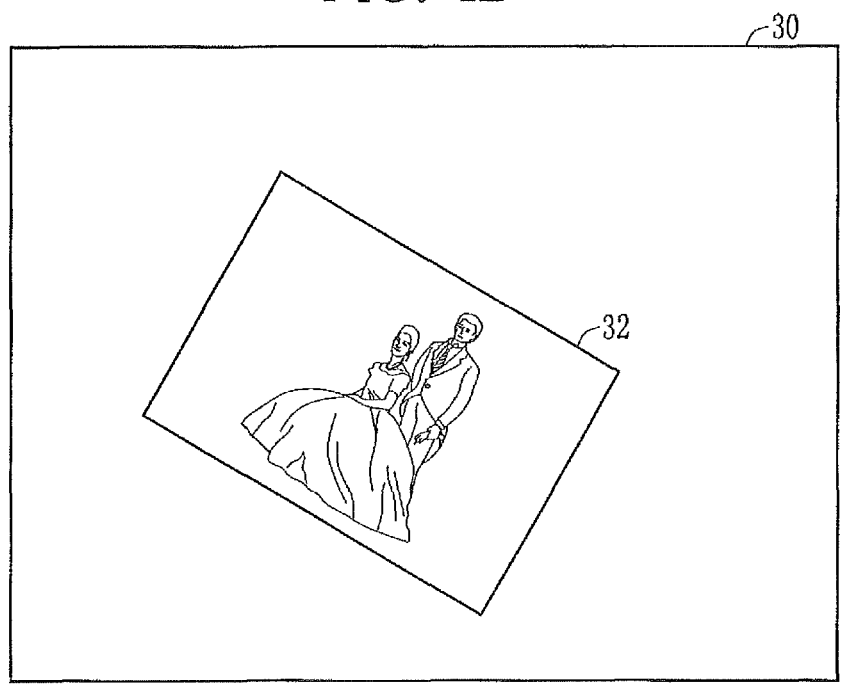
FIG. 4B is an explanatory view illustrating a result of operation of the rotation function.

When the judgment section 25 determines that the execution of the rotation function is requested, the display controller 26 calculates or obtains an angle between a line segment between (1) and (2) and a line segment between (1) and (3). As shown in FIG. 4B, the display controller 26 rotates the still image 32, being the object of editing, about the position (1) of the first touch operation by the angle calculated.

Thus, when the execution of the rotation function is requested by moving the position of the second touch operation in arc around the position of the first touch operation, the still image 32 displayed on the LCD 11 is rotated by a desired angle. Note that, similar to the above-described functions, the still image 32 is rotated continuously in accordance with the movement of the second touch operation when the rotation function is executed.

Similar to the above-described functions, the rotation function can be executed even if two or more still images are displayed on the screen 30. When the rotation function is executed and the still image is rotated, the still image may overlap another still image. In this case, the still images may be overlapped such that the rotated still image, being the object of editing, is displayed on top of the other still image, in a manner similar to the magnification function. Alternatively, the other image may be shifted so as not to overlap the rotated still image, being the object of editing.

Figure 5A:
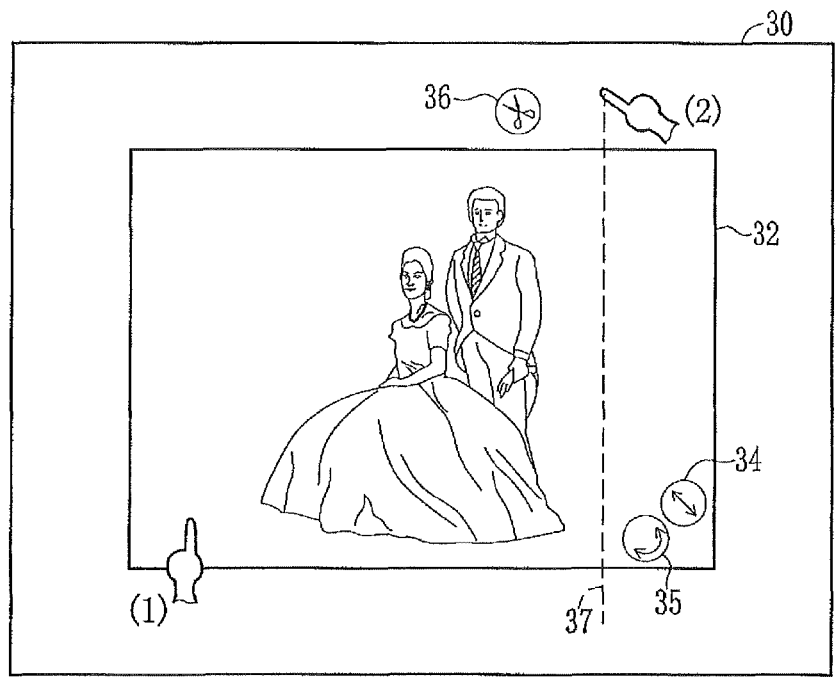
FIG. 5A is an explanatory view illustrating an example of displaying a vertical assistance line of a cropping function.

As shown by (1) in FIG. 5A, after the first touch operation is performed on the still image 32, execution of the cropping function is requested by the second touch operation indicated by (2) performed in a blank space outside of the still image 32 and not displaying any other still image 32. The judgment section 25 determines that the execution of the cropping function on the still image 32, being the object of editing, is requested when the touch panel 12 detects the above-described operation.

The crop icon 36 is displayed outside of and close to the still image 32, being the object of editing. The crop icon 36 is a mark of scissors that is associated with cropping, which helps to show the above-described operation. Note that, other than the intuitive marks, each of the icons 34, 35, and 36 may be a text menu.

When the judgment section 25 determines that the execution of the cropping function is requested, the display controller 26 displays an assistance line 37 that linearly traverses the still image 32, being the object of interest, from the position of the second touch operation in a horizontal or vertical direction of the screen 30. The assistance line 37 indicates or helps to indicate a cropping line (boundary for cropping).

Figure 5B:
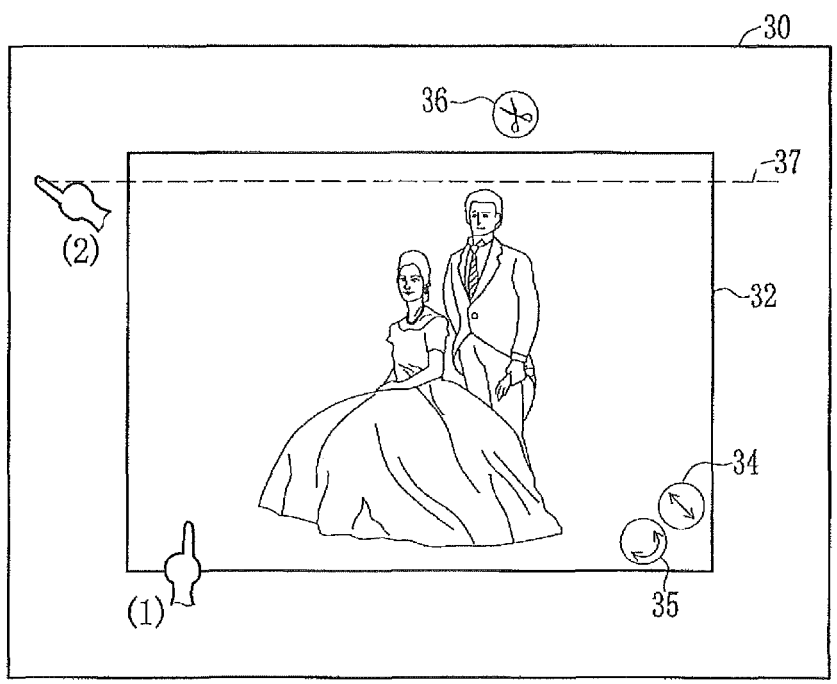
FIG. 5B is an explanatory view illustrating an example of displaying a horizontal assistance line of the cropping function.

As shown in FIG. 5A, the display controller 26 displays the linear assistance line 37 which traverses the still image 32 in the vertical direction when the second touch operation is performed above or below the still image 32, being the object of editing. As shown in FIG. 5B, the display controller 26 displays the linear assistance line 37 which traverses the still image 32 in the horizontal direction when the second touch operation is performed right or left to the still image 32, being the object of editing.

When the touch panel 12 detects the operation to move the position of the second touch operation, located outside of the still image 32, being the object of editing, in the horizontal or vertical direction, the display controller 26 allows the assistance line 37 to follow the movement of the position of the second touch operation. For example, when the position of the second touch operation is moved in the horizontal direction after the second touch operation is performed above the still image 32, being the object of editing, to display the assistance line 37 which traverses the still image 32 in the vertical direction, the assistance line 37 displayed follows the movement in the horizontal direction.

Figure 6A:
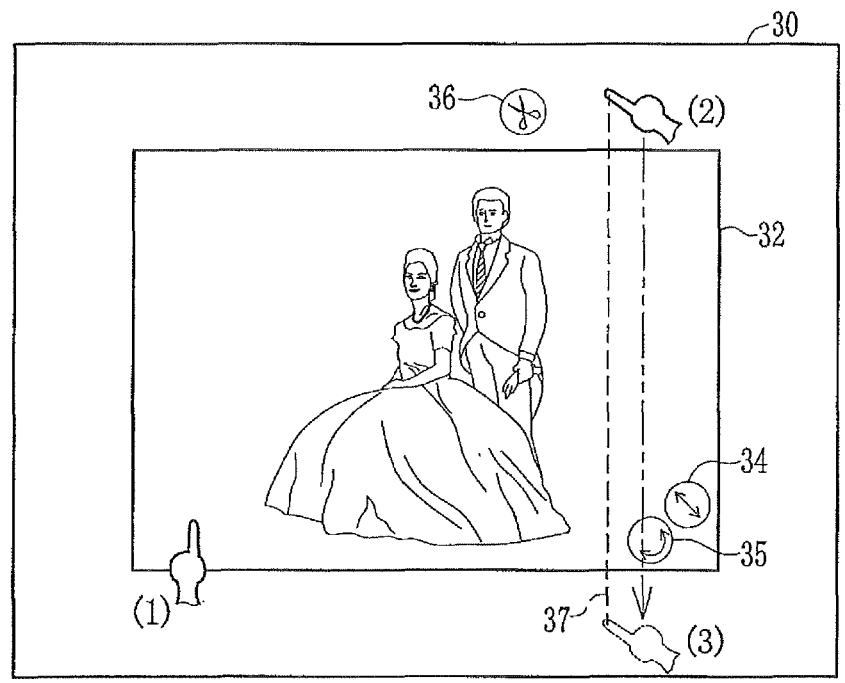
FIG. 6A is an explanatory view illustrating how a cropping operation is performed using the assistance line as a boundary.

As shown by (1) in FIG. 6A, after the assistance line 37 is displayed, the position of the second touch operation is moved from (2) to (3) so as to traverse the still image 32, being the object of editing, while the position of the first touch operation is fixed. When the touch panel 12 detects this movement of the touch position, the still image 32, being the object of editing, is cropped.

Figure 6B:
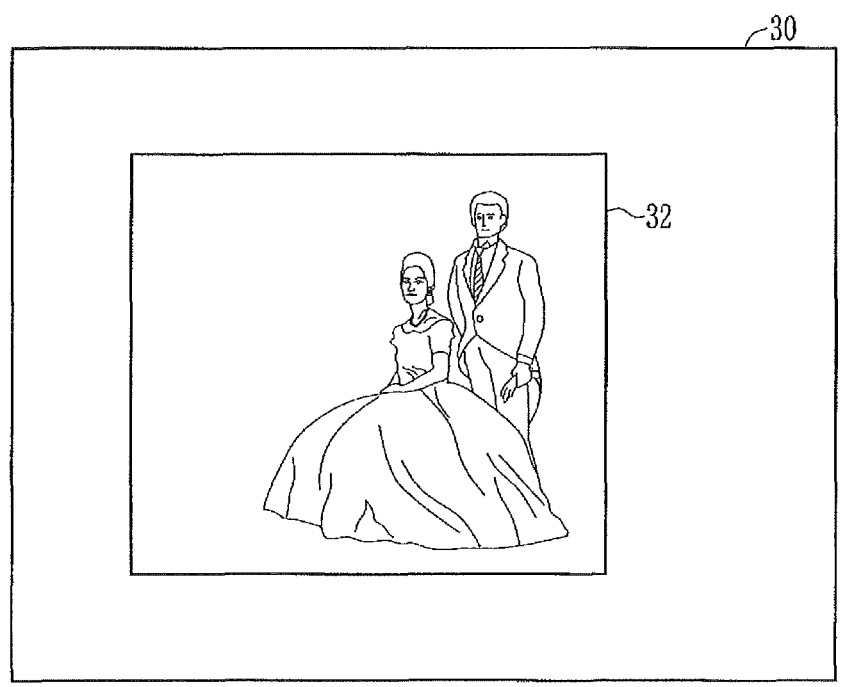
FIG. 6B is an explanatory view illustrating a result of the cropping operation using the assistance line as a boundary.

The display controller 26 measures traversing speed of the finger traversing the still image 32 from (2) to (3), to determine whether the traversing speed is faster than a predetermined value. As shown in FIG. 6B, when the display controller 26 determines that the traversing speed is faster than the predetermined value, the display controller 26 removes an area of the still image 32, on the opposite side of the position of the first touch operation with respect to a boundary for cropping (cropping line) that is the line indicated by the assistance line 37.

Figure 7A:
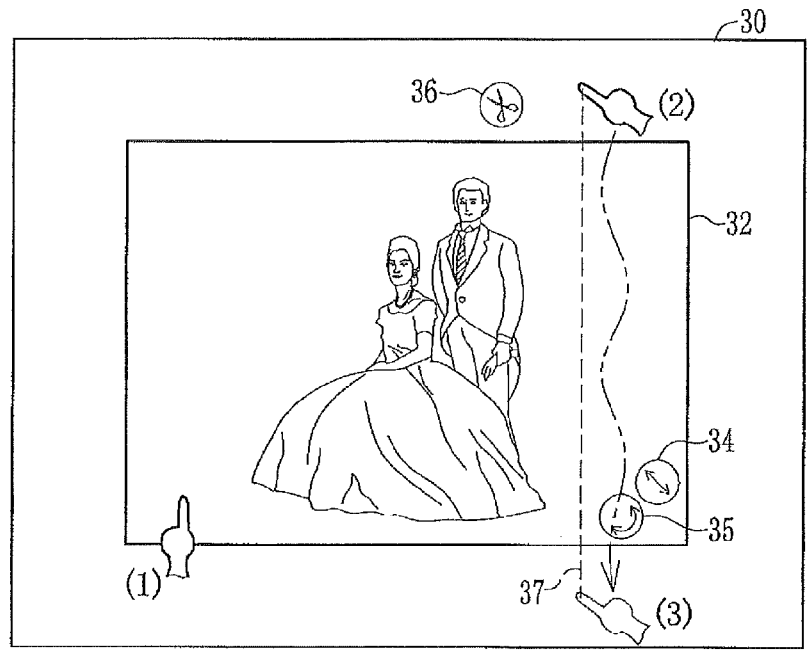
FIG. 7A is an explanatory view illustrating how the cropping operation is performed using a trajectory as the boundary.
Figure 7B:
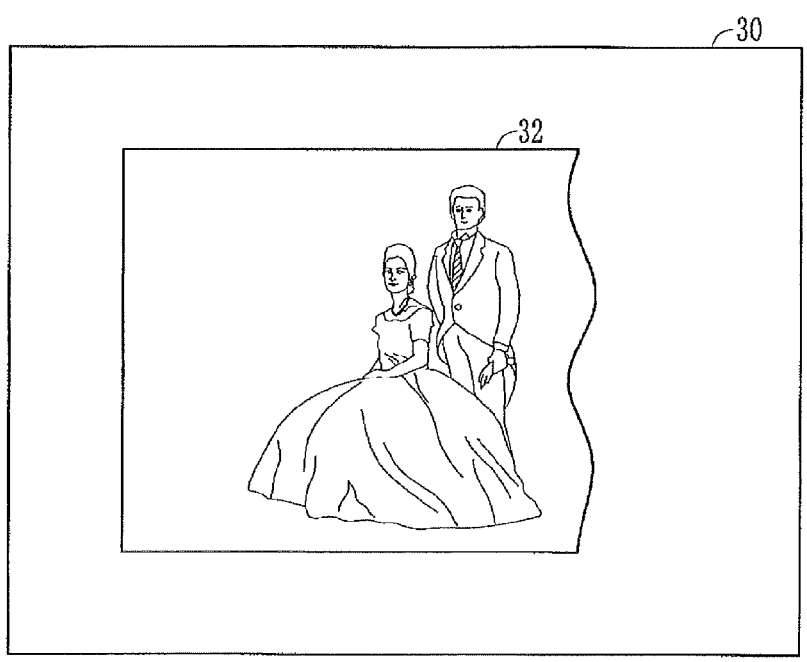
FIG. 7B is an explanatory view illustrating a result of the cropping operation using the trajectory as the boundary.

As shown in FIG. 7A, when the display controller 26 determines that the traversing speed is slower than the predetermined value, the display controller 26 uses the trajectory of the second touch operation as the boundary for cropping. As shown in FIG. 7B, the display controller 26 removes an area of the still image 32, on the opposite side of the position of the first touch operation with respect to the boundary.

Thus, when the execution of the cropping function is requested and the second touch operation is performed so as to traverse the still image 32, being the object of editing, a desired area in the still image 32 displayed on the LCD 11 is removed. The area of the still image 32 on the side of the first touch operation is remained, so that it is not necessary to select which side to be remained with respect to the boundary for cropping. This operation is similar to cutting paper with a cutter or the like. It is easy for a user to crop even if he/she is not accustomed to the operation.

Note that, to calculate the traversing speed, the size of the still image 32 in the traversing direction is divided by the traversing time between the beginning and the end of traversing the still image 32. Alternatively, the traversing time itself can be used as a criterion. When the traversing time is shorter than a predetermined value, the assistance line 37 is used as the boundary for cropping. When the traversing time is longer than the predetermined value, the trajectory is used as the boundary for cropping. Similar to the above-described functions, the cropping function can be executed even if two or more still images are displayed on the screen 30.

Figure 8A:
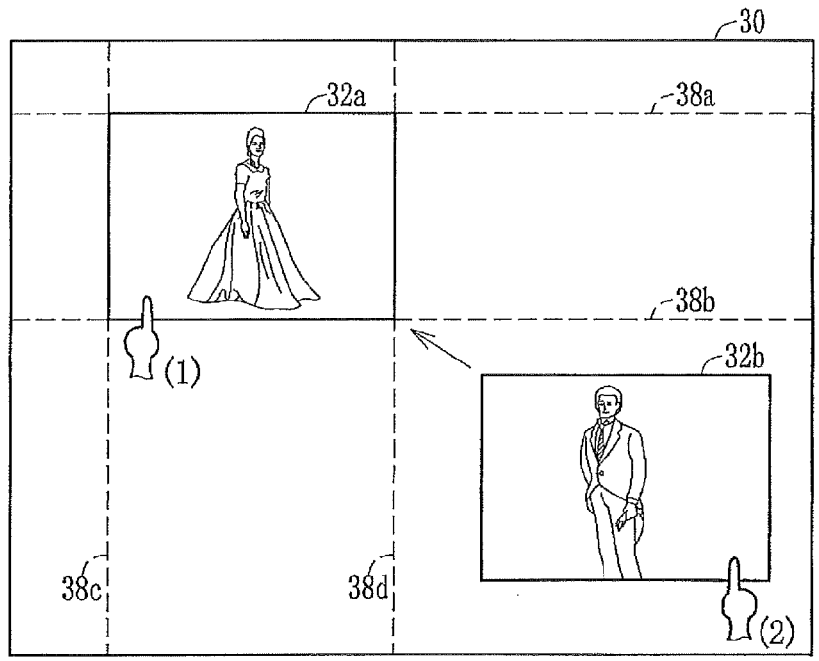
FIG. 8A is an explanatory view illustrating an example of displaying a guide line of a guide line display function.

As shown by (1) in FIG. 8A, the execution of the guide line display function is requested by the second touch operation on a still image 32b after the first touch operation on a still image 32a. When the touch panel 12 detects the above-described operation, the judgment section 25 determines that the execution of the guide line display function on the still image 32, being the object of editing, is requested.

When the judgment section 25 determines that the execution of the guide line display function is requested, the display controller 26 displays four linear guide lines 38a to 38d on the screen 30. The guide lines 38a to 38d are in contact with the respective sides of the rectangular still image 32. The guide lines 38a to 38d extend across the screen 30.

After the display controller 26 displays the guide lines 38a to 38d, when the touch panel 12 detects the operation to move the position of the first or second touch operation on the screen 30 while pressing is maintained, the display controller 26 moves the touched still image 32a or 32b. For example, when the still image 32a is moved, the four guide lines 38a to 38d move together with the still image 32a.

Figure 8B:
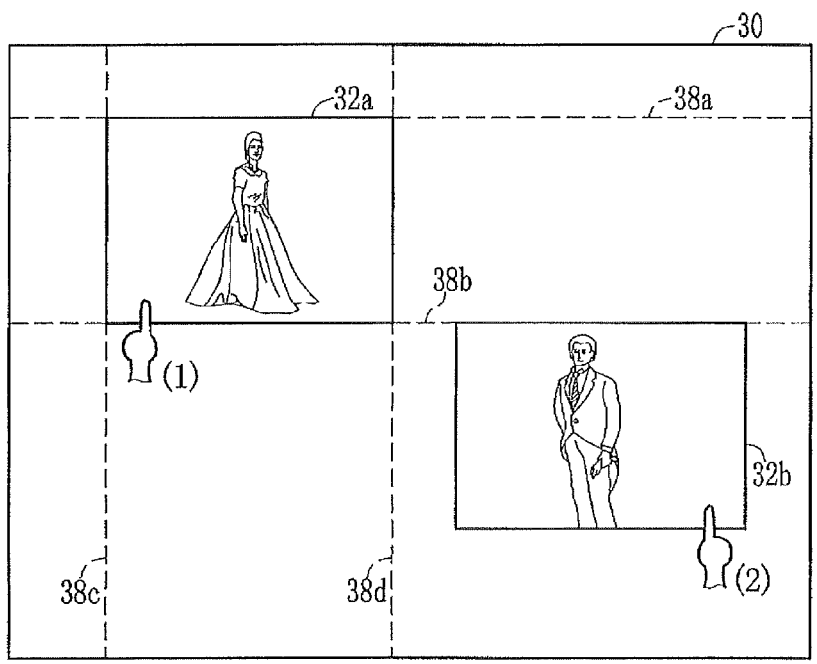
FIG. 8B is an explanatory view illustrating the still image attracted by the guide line.

As shown in FIG. 8B, when the display controller 26 moves the still image 32b and one side of the still image 32b comes in contact with the guide line 38b, the still image 32b is attracted by or sticks to the guide line 38b and stops its movement. When an amount of movement in a direction orthogonal to the guide line 38b exceeds a predetermined amount, the display controller 26 separates the still image 32b from the guide line 38b and starts moving the still image 32b.

For example, as shown in FIG. 8B, when an upper side of the still image 32b sticks to or is fixed along the guide line 38b, the still image 32b moves along the guide line 38b in the horizontal direction in accordance with the movement of the position of the touch operation in a manner similar to the normal operation (move function). On the other hand, the still image 32b does not move in the vertical direction unless the position of the touch operation is moved by an amount greater than or equal to the predetermined amount.

Thus, when the guide line display function is executed, the still images 32a and 32b are aligned easily and neatly in the horizontal, vertical, or oblique direction (a direction parallel to the diagonal line of the still image 32a on which the first touch operation is performed) by moving the still image 32b to come in contact with and along the guide line 38b.

As described above, the judgment section 25 determines that the execution of the move function is requested when the touch panel 12 detects that the position of the first touch operation is moved after the first touch operation is performed. The judgment section 25 determines that one of the magnification function, the rotation function, the cropping function, and the guide line display function is requested based on how the second touch operation is performed while the first touch operation is maintained. The display controller 26 edits the image based on the result of the determination of the judgment section 25 and how the touch operation is performed which is detected by the touch panel 12 after the determination. The display controller 26 displays the edited image on the LCD 11.

Note that the above-described editing functions may be performed simultaneously. For example, the still image, being the object of editing, may be enlarged while being moved. The still image, being the object of editing, may be rotated while being enlarged or reduced. Thus, the size and an angle may be changed simultaneously. Alternatively, only the first editing function that is determined after the still image is designated as the object of editing by the first touch operation may be executed. A mode for executing the editing functions simultaneously and a mode for executing a single editing function may be provided in a selectable manner.

Next, with reference to flowcharts in FIGS. 9 to 15, operation of the image editing apparatus 10 of the above configuration is described. As shown in FIG. 9, to create a photobook using the image editing apparatus 10, first, the recording medium 21 in which the still image data 22 is stored is attached to the media slot of the media controller 17. Then, the touch operation is performed on the touch panel 12 to command the CPU 13 of the image editing apparatus 10 to create the photobook. Thereby, the CPU 13 accesses the recording medium 21 through the media controller 17, and takes the still image data 22, stored in the recording medium 21, into the system memory 14. After taking in the still image data 22, the CPU 13 produces thumbnail images from the still image data 22. The CPU 13 arranges and displays the thumbnail images on the LCD 11 to allow an operator to select the still images 32 to be displayed on the first page of the photobook. The still images 32 to be displayed on the first page are selected by touch-operating one or more thumbnail images corresponding to the still images 32.

After selecting the still images 32, the CPU 13 starts a process to allow the operator to determine whether to use a decorative frame for decorating a peripheral portion of a page of the photobook and a type of the decorative frame. Data of the decorative frames is stored in the system memory 14 in advance. The CPU 13 produces the thumbnail images corresponding to the respective decorative frames from the data of the decorative frames stored in the system memory 14. The thumbnail images are arranged and displayed on the LCD 11 to allow the operator to determine whether to use the decorative frame and to select a type of the decorative frame.

After the decorative frame is selected, the CPU 13 allows the LCD 11 to display the selected still image(s) 32. When the decorative frame is selected, the selected decorative frame is displayed on the LCD 11 together with the still image(s) 32. Thereafter, the CPU 13 starts image editing processes. By editing the still image(s) 32 displayed on the LCD 11, the layout of the first page of the photobook is determined.

In the image editing processes, the above-described editing functions are executed repeatedly in accordance with the commands of the touch operations until the end of the editing processes is commanded by a touch operation of a predetermined icon or the like. When the end of the editing processes is commanded, the CPU 13 temporarily stores data (hereinafter referred to as the edit data), which is the layout result of the page 1 of the photobook produced after the above-described processes, in the system memory 14. Here, the edit data refers to the data that reproduces the layout of the edited page, and stores still image data 22, the type of the decorative frame selected, and the result of editing the still image 32, for example.

After storing the edit data in the system memory 14, the CPU 13 allows the LCD 11 to display a selection screen on which an icon for commanding creation of the next page and an icon for commanding not to create the next page are displayed. One of the icons is touch-operated to select whether the next page is created.

When the creation of the next page is commanded, the CPU 13 allows the LCD 11 to display the thumbnail images again. The thumbnail images correspond to the still image data 22 taken into the system memory 14. By repeating the above-described processes, the edit data of the next page is produced.

When commanded not to create the next page, the CPU 13 converts each of the edit data stored in the system memory 14 into the print data compliant with the model of the printer 23. The CPU 13 outputs the print data to the printer 23 through the output I/F 18 and thereby allows the printer 23 to print. The still image(s) 32, the decorative frame, and the like laid out as desired are printed on a printing medium. The printing media are bound into a book. Thus, the photobook is created.

The CPU 13 prints each of the edit data and also stores each of the edit data in the recording medium 21 to allow a customer to bring the edit data home. The CPU 13 may virtually print the edit data to convert the edit data into image data, and store the image data in the recording medium 21 together with the edit data. Thereby, the customer can reproduce the image data using a digital photo frame or the like to enjoy the photobook as an electronic album.

Figure 10:
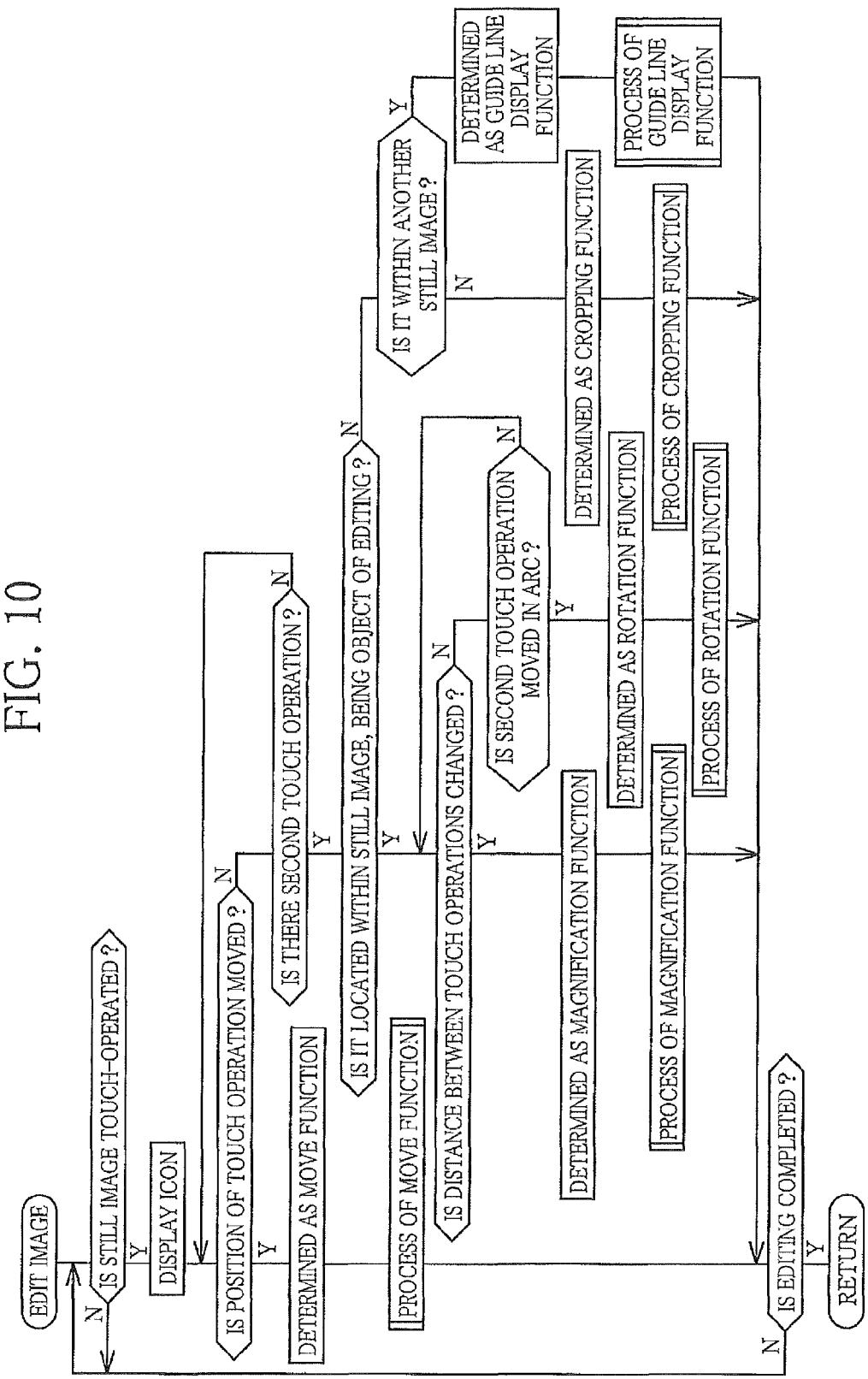
FIG. 10 is a flowchart illustrating steps for image editing processes.

Next, referring to FIG. 10, the image editing processes are described. When the image editing processes are started, the CPU 13 uses the detection function of the touch panel 12 to determine whether the touch operation is performed on the still image 32 displayed on the LCD 11. When the CPU 13 determines that the touch operation is performed on the still image 32, the CPU 13 designates the still image 32 as the object of editing. Thereafter, the CPU 13 allows the judgment section 25 to start determining whether the execution of various editing functions is requested. At the same time, the CPU 13 allows the display controller 26 to display the icons 34, 35, and 36 for the still image 32, being the object of editing.

Figure 11:
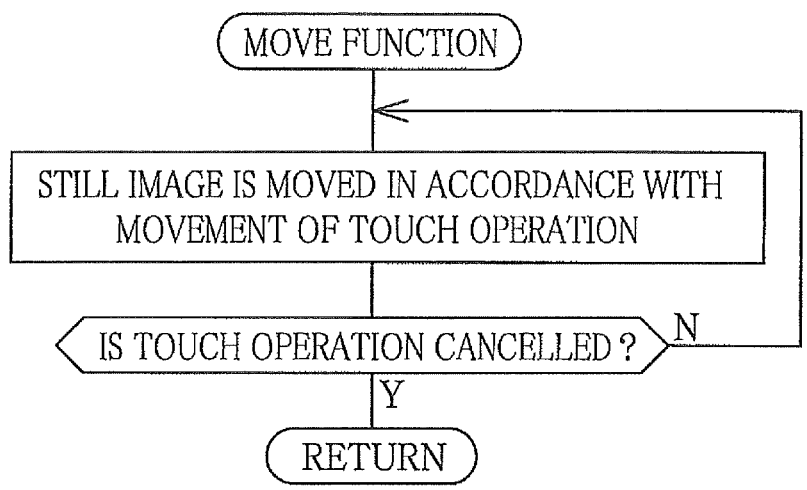
FIG. 11 is a flowchart illustrating steps for a process of the move function.

The judgment section 25 determines that the execution of the move function is requested when the position of the touch operation on the still image 32 is moved while the touch operation on the still image 32 is maintained. Thereby, the display controller 26 starts a process of the move function. In the process of the move function, as shown in FIG. 11, the display is controlled such that the still image 32 is moved in accordance with the position of the touch operation (see FIGS. 2A and 2B). The process of the move function is continued until the touch operation on the still image 32, being the object of editing, is cancelled.

The second touch operation is performed on the still image 32 while the first touch operation on the still image 32 is maintained. In this state, the position of the second touch operation is moved so as to change a distance between the positions the first and second touch operations while the position of the first touch operation is fixed. In this case, the judgment section 25 determines that the execution of the magnification function is requested. Thereby, the display controller 26 starts a process of the magnification function.

Figure 12:
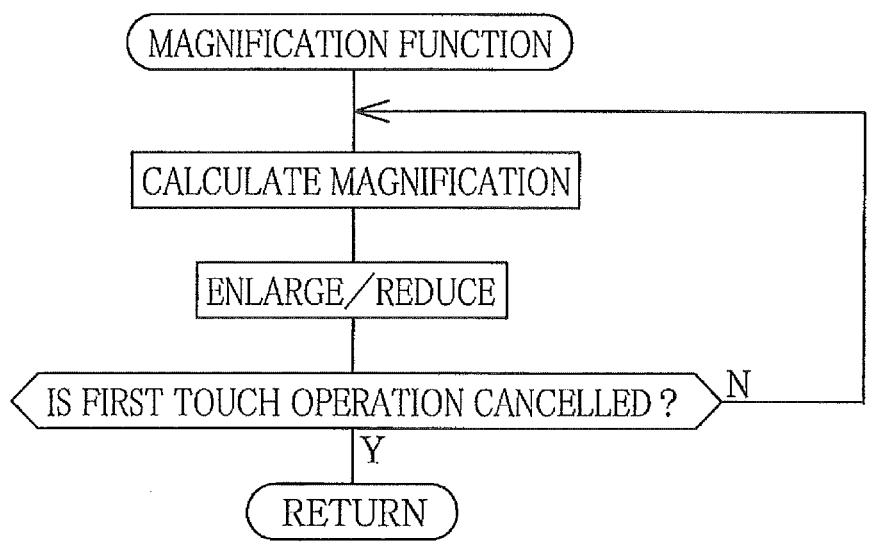
FIG. 12 is a flowchart illustrating steps for a process of the magnification function.

As shown in FIG. 12, in the process of the magnification function, a magnification for enlargement or reduction is calculated from the position of the second touch operation before the movement and the position of the second touch operation after the movement. The display is controlled so as to enlarge or reduce the still image 32, being the object of editing, in accordance with the magnification (see FIGS. 3A and 3B). The process of the magnification function is continued until the first touch operation on the still image 32, being the object of editing, is cancelled.

The second touch operation is performed on the still image 32 while the first touch operation on the still image 32 is maintained. The position of the second touch operation is moved in arc around the position of the first touch operation while the position of the first touch operation is fixed. In this case, the judgment section 25 determines that the execution of the rotation function is requested and the display controller 26 starts a process of the rotation function.

Figure 13:
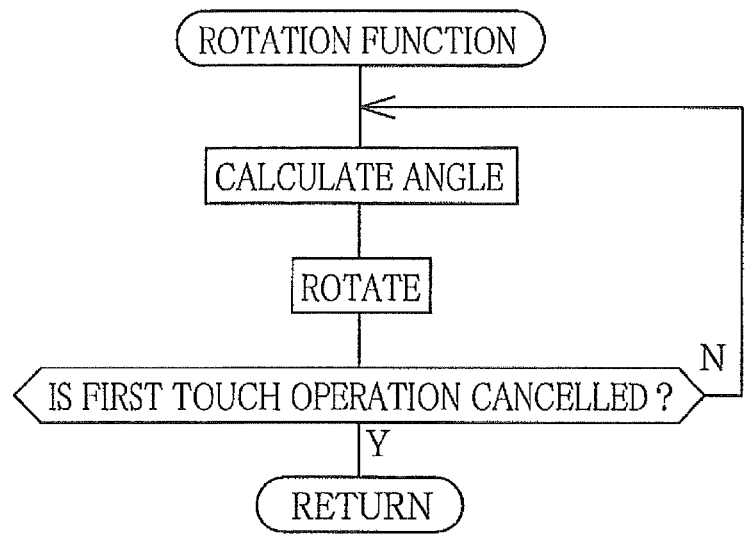
FIG. 13 is a flowchart illustrating steps for a process of the rotation function.

As shown in FIG. 13, in the process of the rotation function, an angle of rotation is calculated from the position of the second touch operation before the movement and the position of the second touch operation after the movement. The display is controlled to rotate the still image 32, being the object of editing, by the angle calculated (see FIGS. 4A and 4B). The process of the rotation function is continued until the first touch operation on the still image 32, being the object of editing, is cancelled.

The judgment section 25 determines that the execution of the cropping function is requested when the second touch operation is performed on a blank space while the first touch operation on the still image 32 is maintained. The blank space is an area outside of the still image 32 and in which no other still image 32 is displayed. Thereby, the display controller 26 starts a process of the cropping function.

Figure 14:
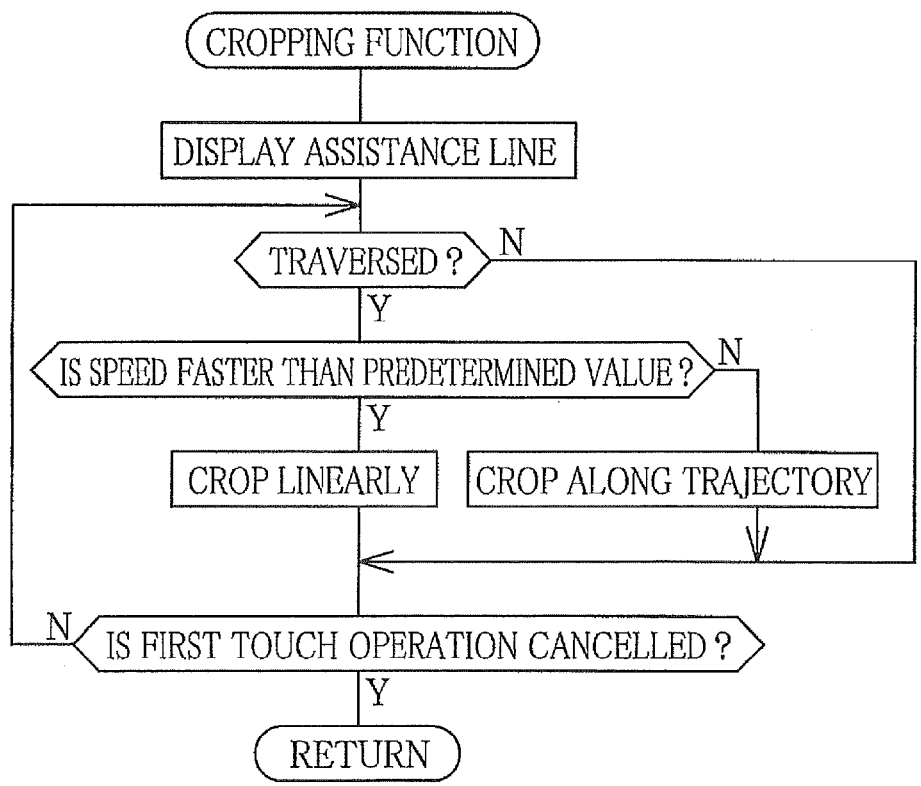
FIG. 14 is a flowchart illustrating steps for a process of the cropping function.

As shown in FIG. 14, in the process of the cropping function, first, the assistance line 37 is displayed on the LCD 11 (see FIGS. 5A and 5B). When the position of the second touch operation is moved to traverse the still image 32, being the object of editing, while the position of the first touch operation fixed, it is determined whether the traversing speed is faster than a predetermined value.

When the traversing speed is faster than the predetermined value, the cropping process is performed using a linear line, indicated by the assistance line 37, as the boundary for cropping (see FIGS. 6A and 6B). When the traversing speed is slower than the predetermined value, the cropping process is performed using the trajectory of the second touch operation as the boundary for cropping (see FIGS. 7A and 7B). The process of the cropping function is continued until the first touch operation on the still image 32, being the object of editing, is cancelled.

When the second touch operation is performed on the still image 32b while the first touch operation on the still image 32a is maintained, the judgment section 25 determines that the execution of the guide line display function is requested. Thereby, the display controller 26 starts a process of the guide line display function.

Figure 15:
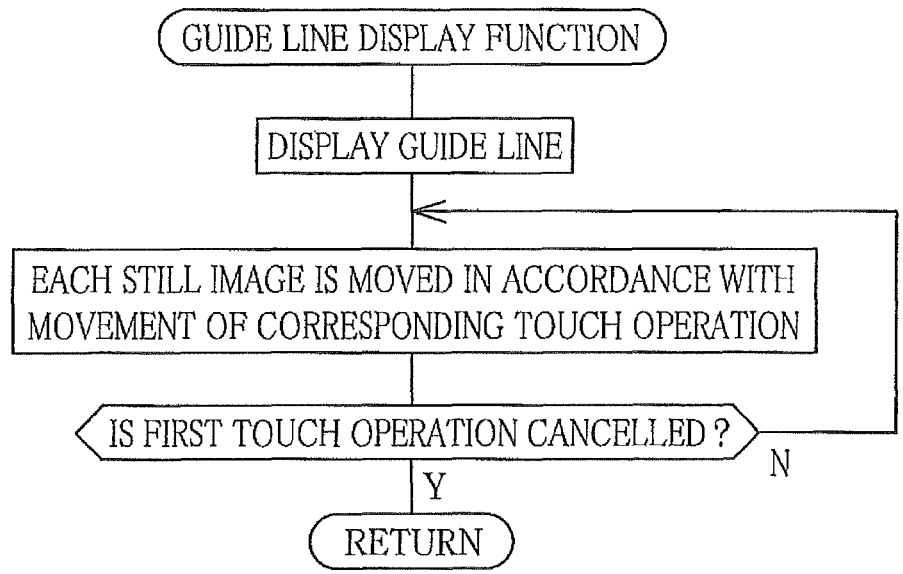
FIG. 15 is a flowchart illustrating steps for a process of the guide line display function.

As shown in FIG. 15, in the process of the guide line display function, first, the four linear guide lines 38a to 38d corresponding to the still image 32a, being the object of editing, are displayed on the LCD 11 (see FIG. 8A). When the positions of the touch operations on the respective still images 32a and 32b are moved, the display is controlled such that the still images 32a and 32b are moved in accordance with the movements of the touch operations in a manner similar to the move function. When a side of the still image 32b comes in contact with the guide line 38b, the display is controlled such that the side of the still image 32b sticks to or is attracted by the guide line 38b (see FIG. 8B). The process of the guide line display function is continued until the first touch operation on the still image 32a, being the object of editing, is cancelled.

As described above, in the image editing processes, the move function is executed by moving the position of the touch operation on the still image. By performing the second touch operation while the first touch operation on the still image is maintained, one of the magnification function, the rotation function, the cropping function, and the guide line display function is executed in accordance with how the second touch operation is performed.

Thereby, the still image is edited only with the intuitive operation that is the touch operation on the screen 30. There is no need to operate an icon or a menu item to edit the still image. Thus, the operability in editing the still image on the screen 30 is improved significantly. Editing the still image only with the intuitive operation allows a user to easily understand or learn how to operate the editing functions. Hence, even the user not accustomed to the operation can create an attractive photobook easily.

Figure 16:
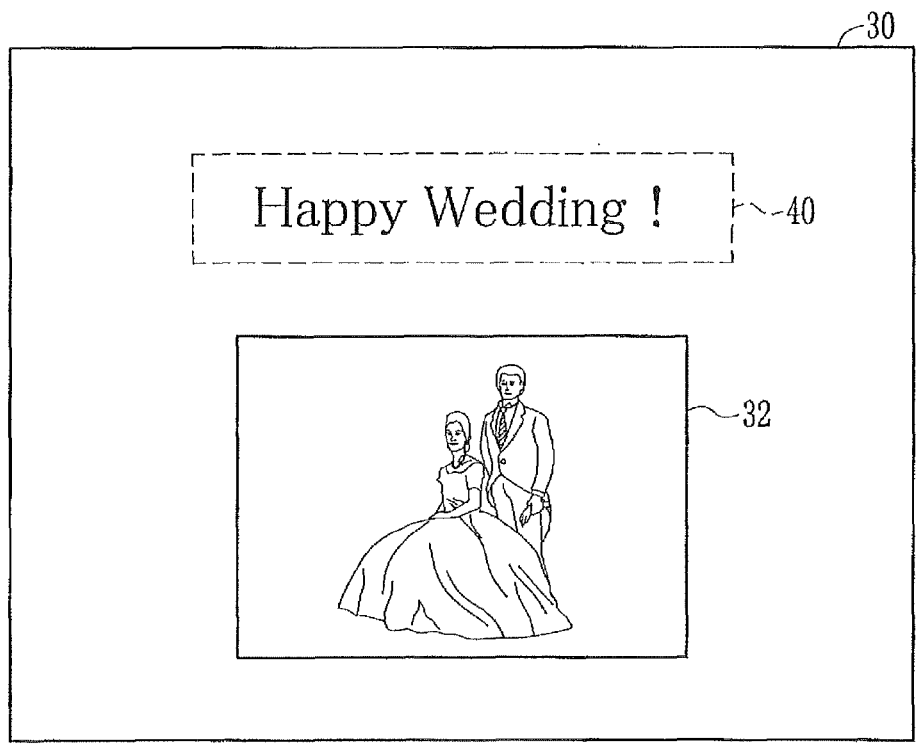
FIG. 16 is an explanatory view illustrating an example of displaying a text input box.

As shown in FIG. 16, a function to display a text input box 40, in which a character string is inputted, on the LCD 11 during the image editing processes may be provided to lay out a desired character string in a desired position on a page of the photobook. It is more preferable that the text input box 40 (character string) is edited using the editing functions (magnification, rotation, and the like) in a manner similar to the still image 32.

In the above embodiments, to request the execution of the magnification function and the execution of the rotation function, the second touch operation is performed within the still image, being the object of editing. Alternatively, the second touch operation may be performed on the blank space outside of the still image, being the object of editing.

Figure 17:
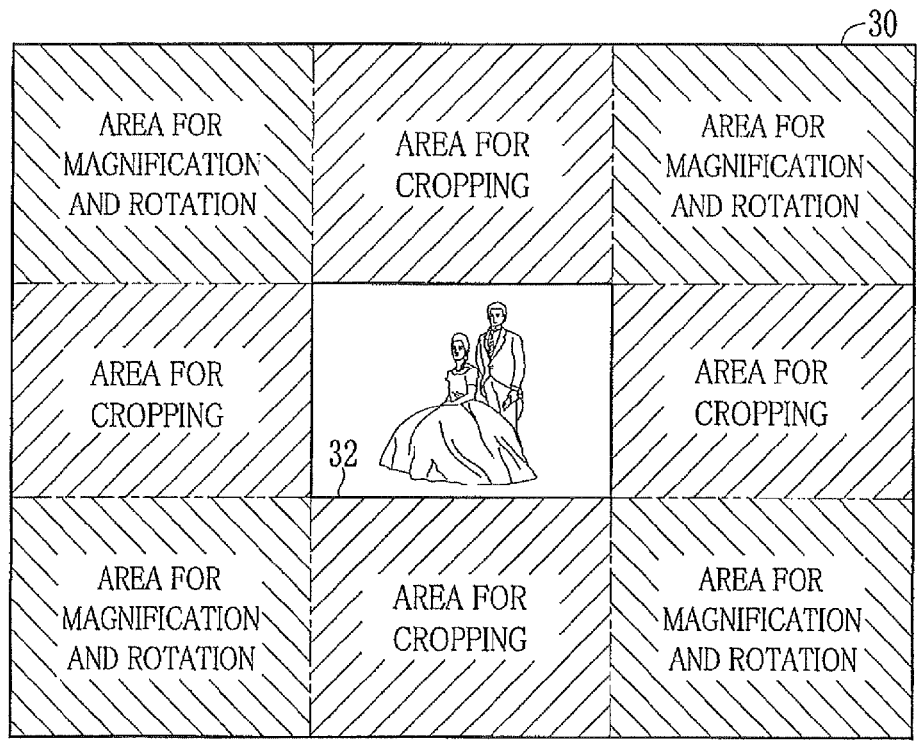
FIG. 17 is an explanatory view illustrating an example of displaying an edit menu.

In the above embodiments, for example, as shown in FIGS. 5A and 5B, the assistance line 37 parallel with the horizontal or vertical direction of the screen 30 is displayed when the cropping function is executed. Hence, the assistance line 37 is not displayed when the second touch operation is performed in an oblique direction outside of the still image 32. To prevent this, as shown in FIG. 17, the blank space surrounding the still image 32 is divided into rectangular blank areas, and each blank area is used as a selection button for selecting specific editing function(s), for example.

The blank areas on the top, bottom, left and right of the still image 32 function as the selection buttons for cropping. When the second touch operation is performed on one of these blank areas, the judgment section 25 determines that the execution of the cropping function is requested. The blank areas located in the oblique directions outside of the still image 32 function as the selection buttons for magnification and rotation. When the second touch operation is performed on one of these blank areas and the position of the second touch operation is moved so as to change the distance between the positions of the first and second touch operations, the judgment section 25 determines that the execution of the magnification function is requested.

On the other hand, the judgment section 25 determines that the execution of the rotation function is requested when the position of the second touch operation is moved in arc. Thus, the judgment section 25 properly determines (distinguishes between) the request of execution of the magnification function and that of the rotation function even if the execution of the magnification function and the execution of the rotation function can be requested by the second touch operation on the same blank area outside of the still image 32, being the object of editing.

In the above embodiments, the assistance line 37 parallel with the horizontal or vertical direction of the screen 30 is displayed when the cropping function is executed. When the position of the second touch operation is moved to traverse the still image 32 at the speed faster than the predetermined value, the cropping is performed using the assistance line 37 as the boundary. Hence, in the configuration of the above embodiments, the linear boundary can be set only in the horizontal or vertical direction. Alternatively, the linear boundary may be set at a desired angle by tilting the assistance line 37 at the desired angle.

Figure 18A:
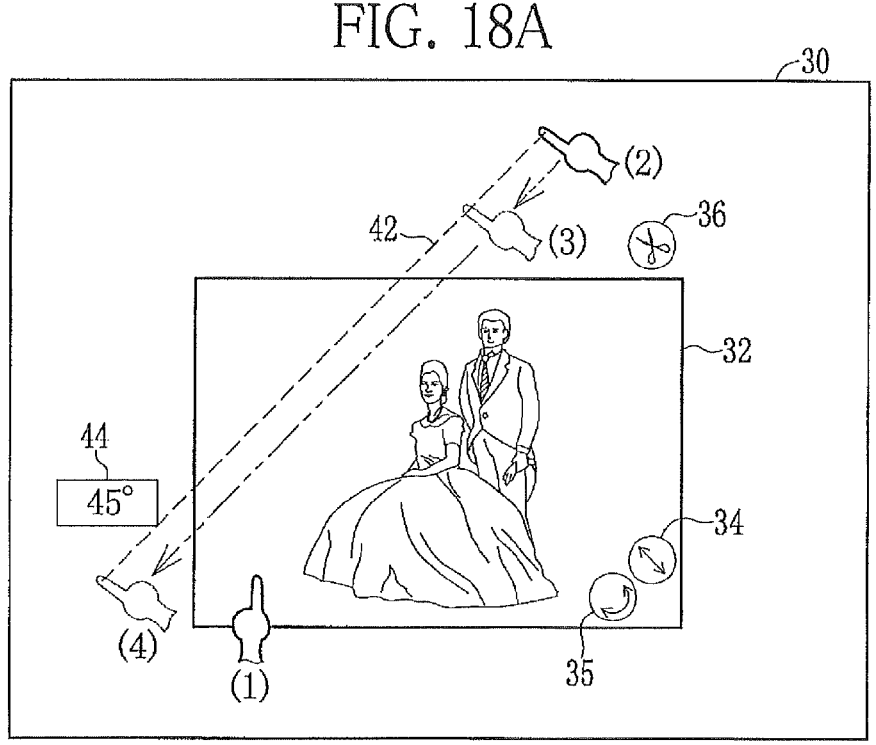
FIG. 18A is an explanatory view illustrating how cropping is performed along a straight line at a given angle.

For example, as shown in FIG. 18A, a position of the second touch operation outside of the still image 32, being the object of editing, is set as a starting point. When the position of the second touch operation is moved from the starting point, a line segment between the starting point and the position of the second touch operation after the movement is determined. The line segment is extended and displayed as an assistance line 42. Thereby, the assistance line 42 is displayed at a desired angle in accordance with the movement of the second touch operation.

Figure 18B:
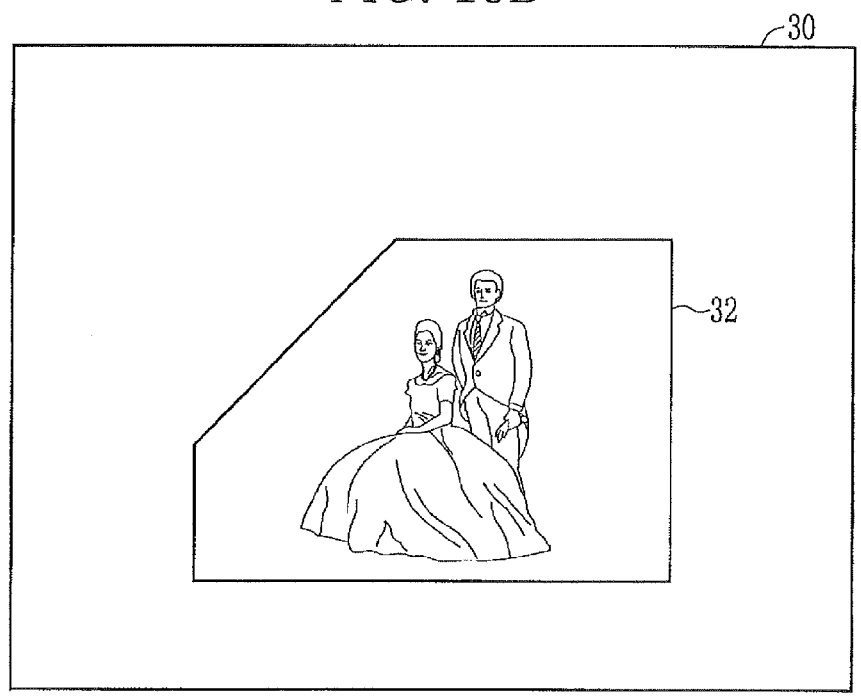
FIG. 18B is an explanatory view illustrating a result of operation of the cropping at the given angle.

When the position of the second touch operation is moved to traverse the still image 32 at a speed faster than a predetermined value, the display controller 26 uses the assistance line 42 as the boundary. Thus, the linear boundary at a desired angle is set. Thereafter, as shown in FIG. 18B, the display controller 26 uses the straight line (indicated by the assistance line 42) as the boundary for cropping, and removes an area of the still image 32, on the opposite side of the first touch operation with respect to the boundary. As shown in FIG. 7B, when the speed of the movement of the second touch operation is slow, the trajectory of the position of the second touch operation is used as the boundary for cropping.

As shown in FIG. 18A, it is more preferable when an angle of the assistance line 42 is notified using a numeric display 44. Note that the angle may be notified using an icon in a shape of a protractor, for example. The linear boundary may be set using a least square method, for example. Thereby, an approximation straight line of the trajectory of the second touch operation is calculated and used as the linear boundary.

In the embodiment shown in FIGS. 8A and 8B, each of the linear guide lines 38a to 38d extend across of the screen 30. Alternatively, each of the guide lines 38a to 38d may not extend to an end of the screen 30. In the above embodiment, the four guide lines 38a to 38d are in contact with the respective sides of the still image 32. The shape of the still image may not necessarily be rectangular because the still image can be cropped into a desired shape. For example, for the pentagonal still image 32 shown in FIG. 18B, five guide lines corresponding to the respective sides of the pentagonal still image 32 may be used. Each guide line is displayed so as to come in contact with the corresponding side.

Figure 19:
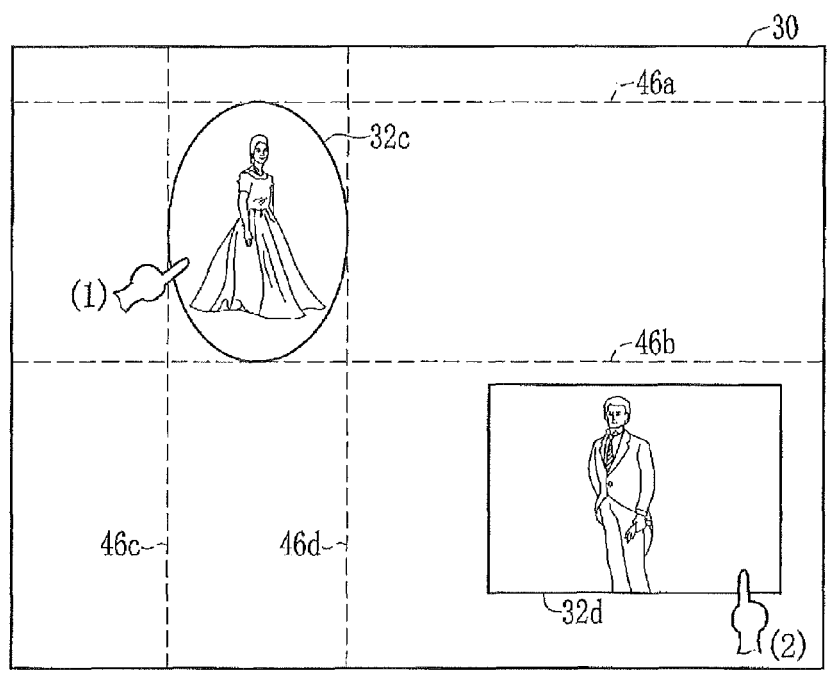
FIG. 19 is an explanatory view illustrating an example of displaying guide lines along a still image of a given shape.

As shown in FIG. 19, when the shape of the still image is not polygonal, two guide lines 46a and 46b, parallel with the horizontal direction of the screen 30, are laid out so as to be in contact with upper and lower edges of a still image 32c, respectively, and two guide lines 46c and 46d, parallel with the vertical direction of the screen 30, are laid out so as to be in contact with left and right edges of the still image 32c, respectively, for example. Thereby, the still images are neatly aligned in the horizontal and vertical directions regardless of the shapes of the still images.

In an embodiment shown in FIGS. 8A and 8B, the side of the still image 32b is fixed along the guide line 38b. Alternatively, an apex of a polygonal shape or a part of a curve may be fixed along the guide line. A type of the guide line to be displayed may be set as necessary when the execution of the guide line display function is requested.

Figure 20A:
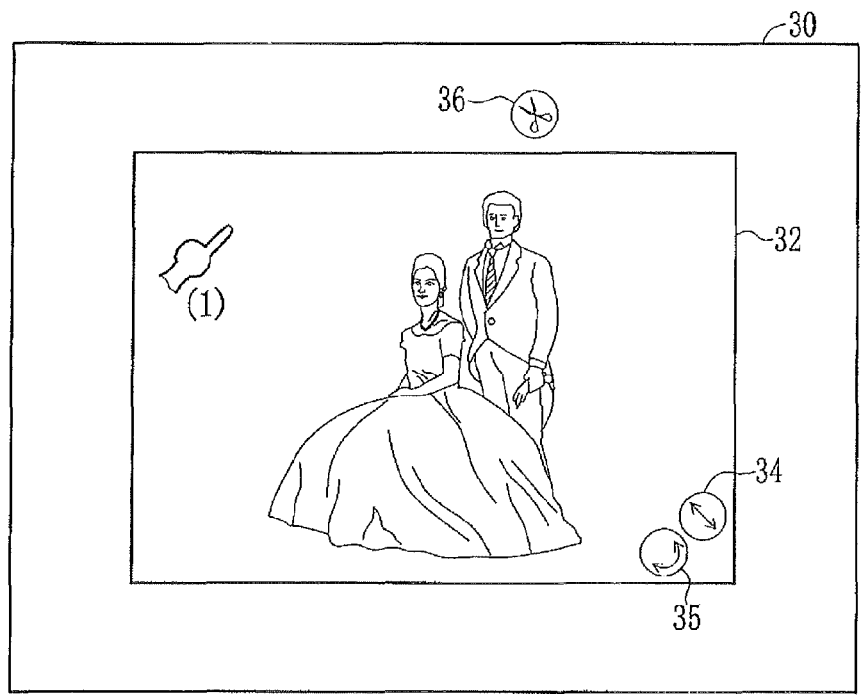
FIG. 20A is an explanatory view of an example of displaying a pointer at a position of a first touch operation.
Figure 20B:
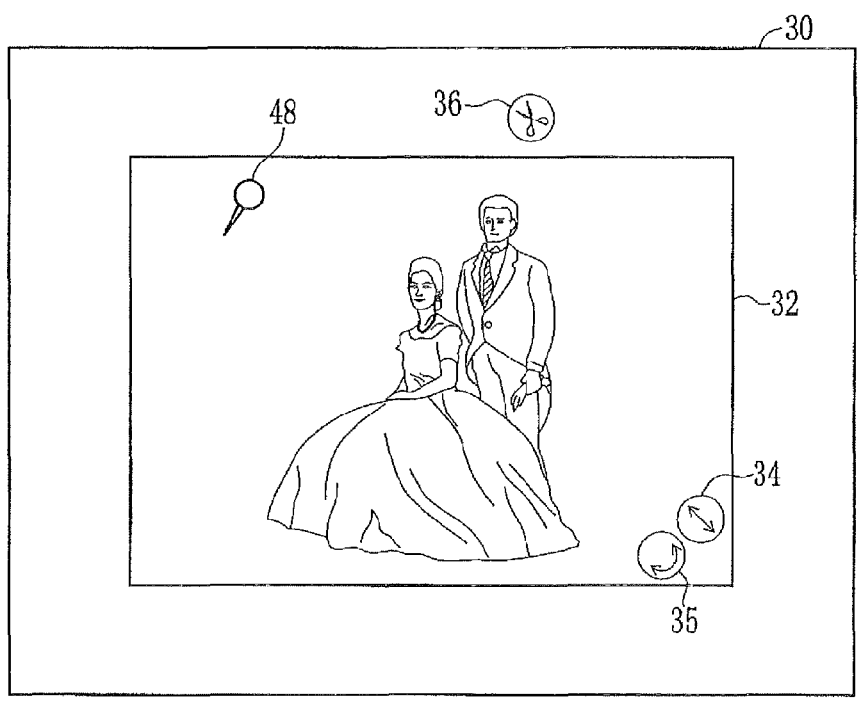
FIG. 20B is an explanatory view of an example of displaying the pointer.

Two hands are used to perform the second touch operation on the still image while the first touch operation is maintained. FIGS. 20A and 20B illustrate the touch operation with one hand. When the first touch operation is stopped (when the finger is lifted) after the first touch operation is performed on the still image 32 as shown in FIG. 20A, a pointer 48, being a mark indicating a position of the first touch operation, is displayed on the LCD 11 as shown in FIG. 20B.

The judgment section 25 and the display controller 26 determine that the first touch operation is maintained while the pointer 48 is displayed. The judgment section 25 determines that the second touch operation is performed when a touch operation is detected by the touch panel 12 while the pointer 48 is displayed.

In this way, the second touch operation is performed in a state that the first touch operation is stopped. Thus, the operation is performed with one hand, making the operation easy.

It is more preferable to provide a mode in which the first touch operation is effective during pressing (touching) and a mode in which the pointer 48 is displayed to make the first operation effective even if the finger is lifted, in a selective manner. Note that, other than the pointer 48, any mark, for example, a pin, a thumbtack, an arrow, a hand or a finger, or a letter which indicates a position of the first touch operation may be used.

The first touch operation is cancelled by deleting the pointer 48. The cancellation is commanded by touch-operating a cancel icon or the pointer 48. Thereby, the pointer 48 is deleted.

In the above embodiments, the move function, the magnification function, the rotation function, the cropping function, and the guide line display function are provided as the editing functions, which are determined by the judgment section 25. Only one of these functions may be provided. Additional editing functions may be provided.

In the above embodiments, the still image data 22 is taken in from the recording medium 21. Other than that, the still image data 22 may be taken in through a network such as the Internet or LAN. In this case, a modem or a router for accessing the network is used as an image input section.

In the above embodiments, the LCD 11 is used as a display section. A well-known display, such as an organic EL display or a plasma display can be used as the display section. In the above embodiments, the image editing apparatus 10 for creating photobook is described by way of example. The present invention is employed when a still image is edited on a screen of a personal computer, a mobile phone (smartphone), a digital camera, or a digital audio player, for example.

Various changes and modifications are possible in the present invention and may be understood to be within the present invention.

What is claimed is:

1. An image editing apparatus having editing functions for editing at least one still image on a display screen, the image editing apparatus comprising:
a touch panel provided over the display screen, the touch panel detecting a position of a touch operation when the position over the display screen is pressed by the touch operation;
a judgment section for determining which of the editing functions is requested to be executed, in accordance with how a second touch operation is performed after a first touch operation is performed on the still image; and
a display controller for controlling a display on the display screen, the display controller executing the editing function determined by the judgment section,
wherein one of the editing functions comprises a cropping function for removing a part of the still image, and the judgment section determines that execution of the cropping function is requested when the second touch operation is performed outside of the still image after the first touch operation on the still image, and the display controller removes the part of the still image along a boundary when a position of the second touch operation is moved to traverse the still image after the judgment section determines that the execution of the cropping function is requested, and the boundary is set based on a trajectory of the second touch operation.

2. The image editing apparatus of claim 1, wherein the judgment section determines the second touch operation when the second touch operation is performed on another position while the first touch operation is maintained.

3. The image editing apparatus of claim 1, wherein the display controller displays a mark on the display screen when the first touch operation is stopped before the second touch operation is performed, and the mark indicates a position of the first touch operation, and the judgment section determines the second touch operation when the second touch operation is performed while the mark is displayed.

4. The image editing apparatus of claim 1, wherein the display controller determines whether a traversing speed for moving the position of the second touch operation to traverse the still image is faster than a predetermined value, and when the display controller determines that the traversing speed is faster than the predetermined value, the display controller sets a straight line corresponding to the trajectory as the boundary, and when the display controller determines that the traversing speed is slower than the predetermined value, the display controller sets the trajectory as the boundary.

5. The image editing apparatus of claim 1, wherein the display controller removes an area of the still image, on an opposite side of the first touch operation with respect to the boundary.

6. The image editing apparatus of claim 1, wherein the display controller displays an assistance line on the display screen when the execution of the cropping function is requested, and the assistance line indicates the boundary.

7. The image editing apparatus of claim 1, wherein one of the editing functions is a guide line display function for displaying a guide line used for aligning at least first and second still images, and the judgment section determines that execution of the guide line display function on the first still image is requested when the second touch operation is performed on the second still image after the first touch operation on the first still image, and the display controller displays the guide line so as to come in contact with the first still image when the judgment section determines that the execution of the guide line display function is requested.

8. The image editing apparatus of claim 1, wherein one of the editing functions is a magnification function for enlarging or reducing the still image to a desired size, and the judgment section determines that execution of the magnification function is requested when a distance between a position of the first touch operation and a position of the second touch operation is widened and narrowed by moving the position of the second touch operation relative to the position of the first touch operation, and the display controller obtains a magnification for enlargement or reduction based on a ratio between a distance from the position of the first touch operation to the position of the second touch operation before a movement and a distance from the position of the first touch operation to a position of the second touch operation after the movement when the judgment section determines that the execution of the magnification function is requested, and the display controller enlarges or reduces the still image from the position of the first touch operation using the magnification.

9. The image editing apparatus of claim 1, wherein one of the editing functions is a rotation function for rotating the still image by a desired inclination, and the judgment section determines that execution of the rotation function on the still image is requested when a position of the second touch operation is moved in arc around a position of the first touch operation, and the display controller obtains an angle between two line segments and rotates the still image by the angle about the position of the first touch operation when the judgment section determines that the execution of the rotation function is requested, and an end of each of the line segments is the position of the first touch operation, and the other end of one of the line segments is the position of the second touch operation before a movement, and the other end of the other line segment is a position of the second touch operation after the movement.

10. The image editing apparatus of claim 1, wherein the display controller displays an icon indicating the next operable editing function on the display screen when the touch operation is performed on the still image.

11. An image editing method for editing at least one still image on a display screen of an image editing apparatus, the image editing apparatus having editing functions to be selectively executed, the image editing apparatus having a touch panel disposed over the display screen, the touch panel detecting a position of a touch operation when the position over the display screen is pressed by the touch operation, the image editing method comprising:
determining which of the editing functions is requested to be executed, in accordance with how a second touch operation is performed after a first touch operation is performed on the still image on the display screen; and
controlling a display of the display screen to execute the editing function determined,
wherein one of the editing functions comprises a cropping function for removing a part of the still image, and the determining determines that execution of the cropping function is requested when the second touch operation is performed outside of the still image after the first touch operation on the still image, and the controlling removes the part of the still image along a boundary when a position of the second touch operation is moved to traverse the still image after the determining determines that the execution of the cropping function is requested, and the boundary is set based on a trajectory of the second touch operation.

* * * * *